United States Patent
De Becdelievre et al.

(10) Patent No.: US 8,122,431 B2
(45) Date of Patent: Feb. 21, 2012

(54) DEVICE FOR PROCESSING FORMALLY DEFINED DATA

(75) Inventors: Michel De Becdelievre, Chaponost (FR); Hervé Morand, Paris (FR)

(73) Assignee: Progilys, Paris (FR)

( * ) Notice: Subject to any disclaimer, the term of this patent is extended or adjusted under 35 U.S.C. 154(b) by 1024 days.

(21) Appl. No.: 11/577,060

(22) PCT Filed: Oct. 11, 2005

(86) PCT No.: PCT/FR2005/002515
§ 371 (c)(1),
(2), (4) Date: Nov. 29, 2007

(87) PCT Pub. No.: WO2006/040473
PCT Pub. Date: Apr. 20, 2006

(65) Prior Publication Data
US 2009/0228865 A1     Sep. 10, 2009

(30) Foreign Application Priority Data
Oct. 12, 2004  (FR) ..................... 04 10736

(51) Int. Cl.
G06F 9/44 (2006.01)
G06F 9/45 (2006.01)
G06F 17/26 (2006.01)

(52) U.S. Cl. ........ 717/114; 717/106; 717/139; 715/234; 715/239

(58) Field of Classification Search ........................ None
See application file for complete search history.

(56) References Cited

U.S. PATENT DOCUMENTS

| 5,897,649 A | 4/1999 | Kennedy |
| 7,155,670 B2 * | 12/2006 | Takizawa et al. ............. 715/239 |
| 7,421,648 B1 * | 9/2008 | Davis ........................... 715/234 |

(Continued)

FOREIGN PATENT DOCUMENTS
WO  00 55766   9/2000

OTHER PUBLICATIONS

S. Dooley, Editing mathematical content and presentation markup in interactive mathematical documents, Jul. 2002, pp. 55-62, <http://delivery.acm.org/10.1145/790000/780514/p55-dooley.pdf>.*

(Continued)

*Primary Examiner* — Thuy Dao
(74) *Attorney, Agent, or Firm* — Oblon, Spivak, McClelland, Maier & Neustadt, L.L.P.

(57) ABSTRACT

A data processing device, including a formula editor capable of establishing a formal mathematical formula with variable identifiers, a set on metadata maintaining correspondence between the identifiers and stored data, and a code generator capable of generating a code executing the formula on the stored data. An editor of conditions establishes an expression of condition operable on database tables to provide a data table. The formula editor authorizes a particular notation bearing on a particular operator and a variable identifier, in the presence of which the condition editor is actuated to establish a correspondence with a particular metadata serving as a pointer to an expression of condition and to a standby table, and the code generator produces through the particular metadata of the executable code resolving the condition and fills the standby table with the data derived from the resolution of the condition and applies the operator to the table.

13 Claims, 10 Drawing Sheets

U.S. PATENT DOCUMENTS

| | | | | |
|---|---|---|---|---|
| 7,472,346 B2* | 12/2008 | Baelen | | 715/234 |
| 2004/0133567 A1 | 7/2004 | Witkowski et al. | | |
| 2005/0144166 A1* | 6/2005 | Chapus et al. | | 707/6 |
| 2006/0206878 A1* | 9/2006 | Uchida | | 717/139 |
| 2006/0242624 A1* | 10/2006 | Mueller-Klingspor | | 717/114 |

OTHER PUBLICATIONS

F. Wright, Interactive mathematics via the Web using MathML, Jun. 2000, pp. 49-57, <http://delivery.acm.org/10.1145/370000/362022/p49-wright.pdf>.*

Bruhn et al., Displaying mathematics in a web browser using MathML and SVG, Apr. 2004, pp. 97-106, <http://delivery.acm.org/10.1145/1050000/1041545/p97-bruhn.pdf>.*

Dooley, S. S, "Editing Mathematical Content and Presentation Markup in Interactive Mathematical Documents", Proceedings of the 2002 International Symposium on Symbolic and Algrebraic Computation, pp. 55-62, 2002.

Carlisle, D.,"OpenMath, MathML and XSL", Sigsam Bulletin, Association for Computing Machinery, vol. 34, No. 2, pp. 6-11, 2000.

Grivas, G.,"Efficient Integration of Declarative Paradigms into Symbolic Computation Systems", Proceedings ICLP 94 of the Post Conference Workshop on Integration of Declarative Paradigms, 1994.

* cited by examiner

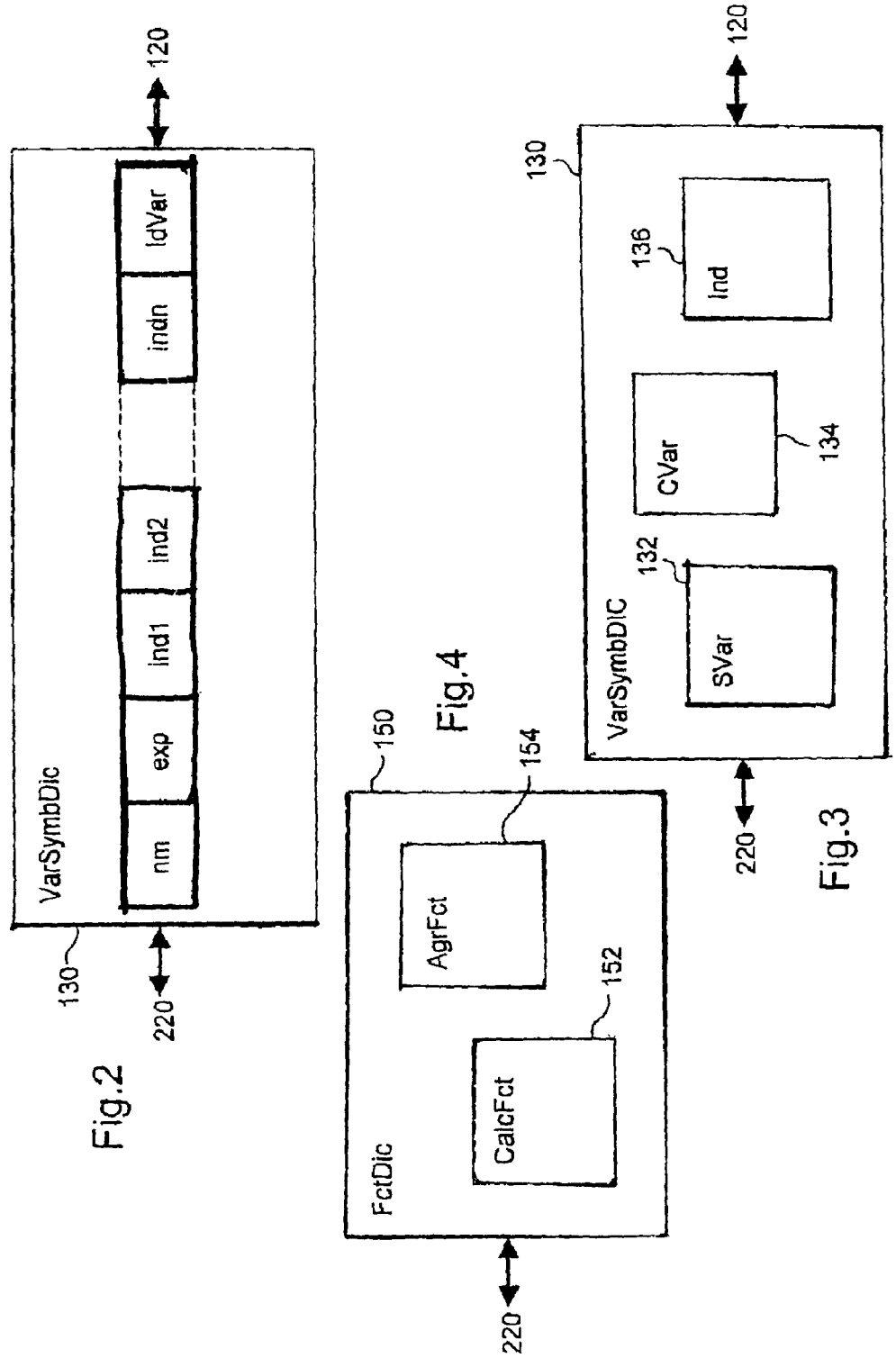

DEVICE FOR PROCESSING FORMALLY DEFINED DATA

The invention relates to data processing devices and more particularly a data processing device, comprising a formula editor, capable of producing a mathematical formula obeying first formal rules, using variable identifiers, a set of metadata, capable of maintaining correspondence between the variable identifiers and data stored in memory, and a code generator, capable of creating code executing the mathematical formula on stored data.

Mathematical software programs use a mathematical natural language that they are capable of interpreting for carrying out mathematical formal calculations. They are not adapted to processing a large volume of data. Furthermore, they are not adapted to managing indices as undefined variables for example in function form.

Spreadsheets use a language that is specific to them for expressing processing on data. They are furthermore limited by the volume of data they can process.

Code generators provide the transcription of computer objects into executable code. They do not allow the conversion of a mathematical formula into executable code. They are furthermore intended for users familiar with computing.

The object of the invention is in particular to overcome the aforementioned drawbacks by proposing a data processing device comprising a condition editor, capable of producing an expression representing a condition, usable on one or more tables of a database, in order to provide an output in the form of a named data array, in which the formula editor is arranged to process a formula, whilst permitting a particular notation therein, concerning a particular operator, and a variable identifier, in which, in the presence of such a particular notation in the formula editor, the condition editor is capable of being activated in order to establish correspondence between this particular notation and a particular item of metadata, which is equal to a pointer to both a condition expression and a standby array, and in which the code generator is arranged to react upon encountering, in a formula, said particular notation with its associated variable identifier, by producing, using the particular item of metadata, executable code capable of resolving the condition contained in said expression, whilst filling the standby array with the data resulting from resolution of the condition, as well as applying the particular operator to this data array.

The device according to the invention thus allows the definition of a computer processing operation, for example a calculation, to be carried out on large volumes of data, said processing operation being expressed in mathematical natural language.

Other features and advantages of the invention will emerge from an examination of the following detailed description and the accompanying drawings, in which:

FIGS. 2 to 4 are diagrams functionally depicting details of elements of FIG. 1;

In addition:

Appendix 1 is a glossary;

Appendices 2 and 3 retranscribe mathematical formulae in different forms used for the description; and Appendix 4 details the notion of a hash function.

The drawings and appendices to the description comprise, for the main part, elements of a certain nature. They can therefore not only serve to make the description better understood, but also contribute towards the definition of the invention, if need be.

The present document may contain elements liable to protection by authors' rights or copyright. The holder of the rights has no objection to reproduction in identical form by anyone of this patent document, as it appears in the files and/or publications of the patent offices. On the other hand, they reserve for the rest their entire authors' rights and/or copyright.

Figure 1:
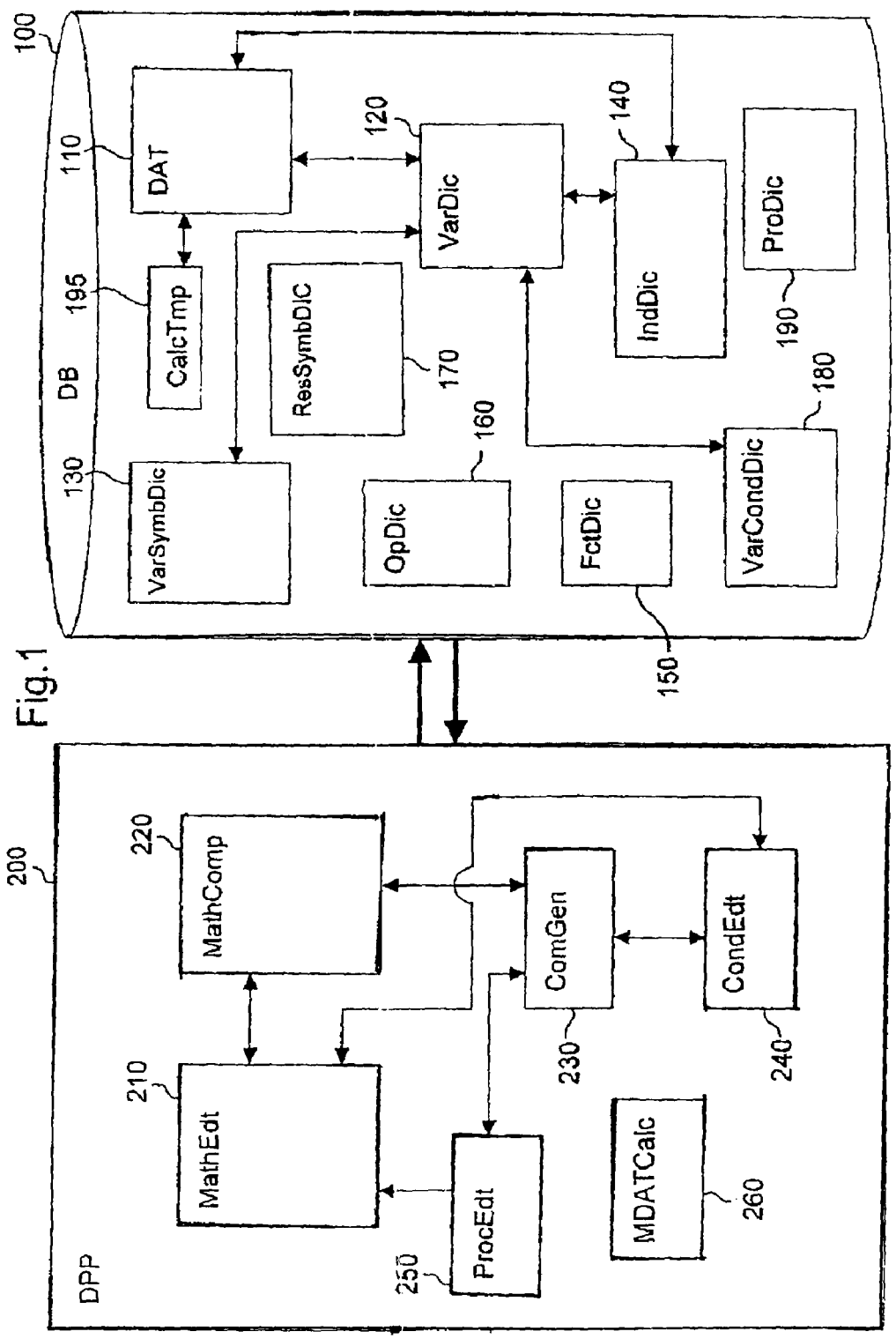
FIG. 1 is a diagram functionally depicting the different elements of a data processing device according to the invention, taken as a whole.

FIG. 1 depicts a data processing device according to the invention. The data processing device comprises a database DB 100 stored in the memory of a central computer unit not depicted in FIG. 1 and a data processing program DPP 200 executable in the memory of a central computer unit, not depicted. In one embodiment of the invention, the database DB 100 and the data processing program DPP 200 are stored in the same central computer unit memory. A definition of the term "database" is given in Appendix A.1.1.

The data processing program DPP 200 is capable of interacting with the database DB 100 by means known to persons skilled in the art in order to carry out conventional computing actions. These actions comprise operations on the data contained in the database DB 100 such as reading, writing, searching and updating and actions on the structure of the database DB 100 such as creating and deleting tables, etc. A definition of the term "table" is given in Appendix A.1.2.

The database DB 100 contains data to be processed DAT 110. The data to be processed DAT 110 is stored in an organised manner in a plurality of tables each containing rows and columns as indicated in Appendix A.1.2.

In the database DB 100, the columns can be characterised as a key column or type K column, a technical column or type T column, a quantitative column or type Q column, or as a status column or type S column.

A definition of the expression "key column" is given in Appendix A.1.10. Technical columns, or T columns, contain data useful for the functioning of the device according to the invention. For example, a particular technical column may contain an identifier of a processor taking part in the processing of the data to be processed DAT 110. Quantitative columns, or Q columns, contain numerical data representing quantities useful to a user of the device according to the invention. Status columns, or S columns, contain alphanumeric data useful to a user of the device.

The data processing program DPP 200 comprises a mathematical expression editor MathEdt 210 allowing a user to enter mathematical expressions in natural language. Entry can be made by means of a graphical user interface, not depicted. A definition of the expression "mathematical natural language" is given in Appendix A.1.3. In particular, the mathematical expression editor MathEdt 210 allows the entry of mathematical formulae linking variables, operations and mathematical functions. Furthermore, the mathematical expression editor MathEdt 210 allows the entry in natural language of mathematical conditions on these variables. A definition of the term "variable" is given in Appendix A.1.4. Appendix A.2.1 illustrates for example a mathematical formula expressed in mathematical natural language.

In the device according to the invention, the variables involved in the mathematical formulae entered in the mathematical expression editor MathEdt 210 point to data to be processed DAT 110. Thus, one of the functionalities of the device according to the invention is to allow the implementation of a processing operation on data in the database DAB 100, said processing operation possibly being expressed in mathematical natural language.

In mathematical natural language, an operation is represented by an operator, a variable by a variable symbol and a function by a function symbol. A definition of the terms "operator", "variable symbol" and "function symbol" is given in Appendices A.1.5, A.1.6 and A.1.7 respectively. Thus, a mathematical formula entered by means of the mathematical expression editor MathEdt 210 contains only variable symbols, function symbols and operators. Appendix A.1.6 furthermore describes a convention relating to variable symbols. The convention of Appendix A.1.6 is specific to the device according to the invention. Appendix A.2.3 illustrates for example a variable symbol conforming to the conventions of Appendix A.1.6.

Furthermore, the mathematical expression editor MathEdt 210 allows the entry of execution conditions for a mathematical formula entered using condition operators, concerning for example variable symbols. A list of condition operators that can be associated with a mathematical formula is given in Appendix A.1.15.

The mathematical expression editor MathEdt 210 is a metalanguage editor capable of generating a representation of a mathematical expression entered in mathematical natural language obeying formal rules. In a preferred embodiment, the mathematical expression editor MathEdt 210 is a MathML 2.0 editor capable of generating mathematical expressions conforming to the MathML 2.0 standard. A definition of the MathML 2.0 language is given in Appendix A.1.8. An editor of this type is known to persons skilled in the art. For example WEB EQ software marketed by the company DESIGN SCIENCE is known. Appendix A.2.2 illustrates the formula of Appendix A.2.1 expressed in MathML 2.0 metalanguage and generated by the mathematical expression editor MathEdt 210.

The data processing program DPP 200 furthermore comprises a mathematical expression compiler MathComp 220 capable of producing a compilation tree representing a mathematical expression in metalanguage, in particular in MathML 2.0. Various definitions of the expression "compilation tree" are given in Appendix A.1.9.

The mathematical expression compiler MathComp 220 is capable of producing a compilation tree containing only identified operations and identified symbols, i.e. variables and conditions. The mathematical expression compiler MathComp 220 will be considered in further detail in the remainder of the present description.

The data processing program DPP 200 furthermore comprises a command generator ComGen 230 capable of producing, from a compilation tree containing identified operations, variables and conditions, a list of concerned tables and joins between said concerned tables and data to be processed DAT 110. Furthermore, the command generator ComGen 230 is capable of generating a series of commands that the engine (not depicted) of the database DB 100 is capable of executing and corresponding to the compilation tree. The command generator ComGen 230 for example generates commands in SQL language.

The database DB 100 comprises a variable dictionary VarDic 120 capable of maintaining a relationship between a variable identifier specific to each variable and a link to key columns of the data to be processed DAT 110, the combination of which makes it possible to uniquely define this variable. A definition of the term key column is given in Appendix A.1.10. In this paragraph, the term variable should be understood in the sense defined in Appendix A.1.4.2. Optionally, the variable dictionary VarDic 120 is capable of specifying, for each variable, whether it is a key variable or not.

The database DB 100 furthermore comprises a variable symbol dictionary VarSymbDic 130 capable of maintaining, for at least some of the variables, a relationship between these variables in the variable dictionary VarDic 120 and variable symbols. The variable symbol dictionary VarSymbDic 130 stores, for each variable concerned, a representation in metalanguage, for example in MathML 2.0, of a variable symbol broken down as described below.

According to the convention described in Appendix A.1.6, a variable symbol visually comprises a first series of characters forming a variable name, a second series of characters arranged as an exponent and a third series of characters arranged as an index. The second and third series of characters are optional. The third series of characters can comprise several series of characters separated from one another by the comma character ",", each series of characters then forming an index. Appendix A.2.3 shows a variable symbol conforming to the convention of Appendix A.1.6.

Furthermore, the database DB 110 comprises an index dictionary IndDic 140, capable of maintaining, for each variable concerned, a relationship between the variable identifier and a list of associated indices. The index dictionary IndDic 140 maintains, for each index associated with a particular variable, a link between the index and one of the key columns of the data to be processed DAT 110 defining this variable.

FIG. 2 illustrates logically the storing of variable symbols in the variable symbol dictionary VarSymbDic 130. A row stores a symbol associated with a variable by storing in a first column the first character string (nm slot), the second series of characters in a second column (exp slot) and each character string of the third character string in separate columns (ind1, ind2, etc. slots). The variable dictionary VarSymbDic 130 also maintains a link between a variable identifier (IdVar slot) associated with a variable symbol and the area in the variable dictionary VarDic 120 relating to this variable.

Appendix A.2.4 illustrates the expression of the variable symbol of Appendix A.2.3 in MathML 2.0. In Appendix A.2.4.1, there can be seen the <msubsup> tag introducing a symbol with index and exponent. The name of the variable, the index and the exponent are each introduced by <mrow> tags of the same hierarchical level, this level being just below that of the <msubsup> tag as shown respectively by Appendices A.2.4.2, A.2.4.3 and A.2.4.4. It should be noted that each series of characters is enclosed by the tag pair <mi> and </mi>.

As shown in FIG. 1, the database DB 100 comprises a function symbol dictionary FctDic 150 maintaining a list of mathematical functions it is possible to implement, in particular on variables. Each function is stored in conjunction with a function symbol expressed in metalanguage, for example MathML 2.0. In the MathML 2.0 language, function symbols are marked by specific tags. For example, the <msqrt> tag represents the square root function.

The database DB 100 furthermore comprises an operation dictionary OpDic 160 maintaining a relationship between operators and operations. In the MathML 2.0 language, an operator is introduced by a tag pair <mo></mo>. For example, <mo>+</mo> introduces the addition operator.

Finally, the database DB 100 comprises a dictionary ResSymb 170 of symbols that are reserved by the device. Reserved symbols do not appear in any other symbol dictionary.

FIG. 3 specifies the structure of the variable symbol dictionary VarSymbDic 130. The variable symbol dictionary VarSymbDic 130 comprises a table of simple symbols SVar 132. A simple symbol is a symbol with neither index nor exponent. In this case, only the first character string is stored (nm slot). The variable symbol dictionary VarSymbDic 130 also comprises a table of complex symbols CVar 134. A complex symbol is a symbol having one or more indices and/or an exponent.

FIG. 4 specifies the structure of the function symbol dictionary FctDic 150. The function symbol dictionary FctDic 150 comprises a table of calculation functions CalcFct 152 and a table of aggregative functions AgrFct 154. A definition of the expressions "calculation function" and "aggregative function" is given respectively in Appendices A.1.11 and A.1.12.

The data processing program DPP 200 furthermore comprises a condition editor CondEdt 240 capable of interacting with the variable dictionary VarDic 120, the index dictionary IndDic 140 and the code generator ComGen 230. The condition editor is capable of associating, with a variable contained in the variable dictionary VarDic 120, conditions on the value of its key columns. Similarly, the condition editor CondEdt 240 is capable of associating conditions with an index contained in the index dictionary IndDic 140. The conditions are stored in a variable conditions dictionary VarConDic 180 of the database DB 100. Preferably, the condition editor CondEdt 240 is a graphics type editor capable of displaying, for a selected variable, a list of key columns defining this variable. Advantageously, the condition editor CondEdt 240 is in this case capable of interacting with the mathematical expression editor MathEdt 210 in order to allow the selection of a variable directly from this mathematical expression editor.

Figure 5:
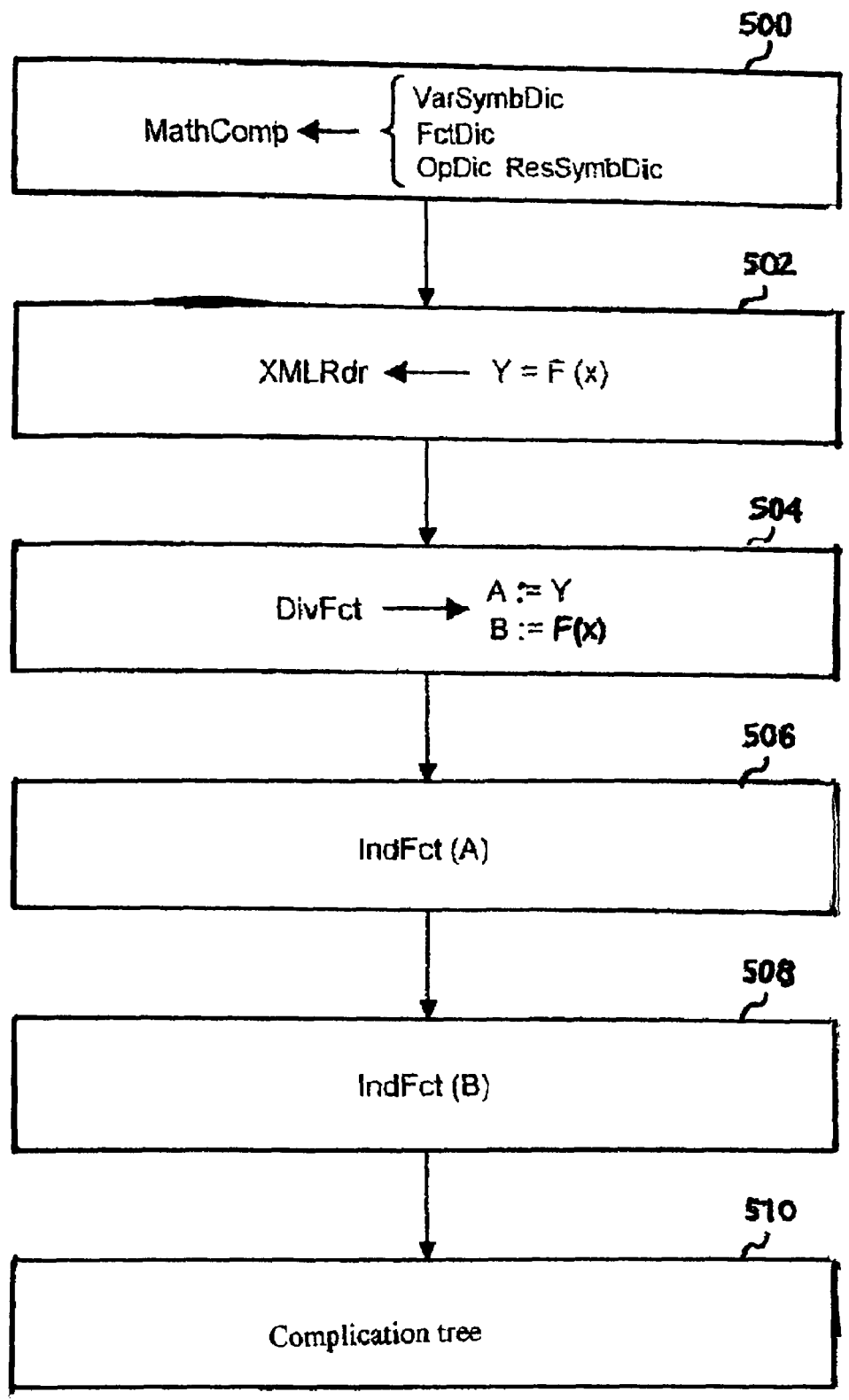
FIGS. 5 and 6 are flow diagrams illustrating the functioning of an element of FIG. 1.

The flow diagram of FIG. 5 details the functioning of the mathematical expression compiler MathComp 220 for a formula type mathematical expression entered in the mathematical expression editor MathEdt 210. A formula can be expressed in mathematical natural language and in generic form by the equation $Y=F(X)$. Appendix A.3.1 gives an example of a mathematical formula expressed in mathematical natural language. The variable symbolised by Y is referred to as an output variable whilst the variable symbolised by X is referred to as an input variable. A mathematical formula may comprise several input variables.

At operation 500, the mathematical expression compiler MathComp 220 loads into memory the various symbol dictionaries, that is to say the variable symbol dictionary VarSymbDic 130, the function symbol dictionary FctDic 150, the operator dictionary OpDic 160 and the reserved symbol dictionary ResSymbDic 170.

At operation 502, the mathematical expression compiler MathComp 220 loads the expression in MathML 2.0 language of the formula $Y=F(X)$. Appendix A.3.2 illustrates the expression in MathML 2.0 of the formula of Appendix A.3.1 as loaded by the mathematical expression compiler MathComp 220.

The expression is loaded by means of a metalanguage reader XMLRdr. The metalanguage reader XMLRdr is capable of producing a simplified representation in tree form of an expression conforming to the XML standard. In such a representation, the nodes of the tree are the XML tags making up the expression. Each tag has a character string as an argument.

Thus the metalanguage reader XMLRdr is capable of producing an XML tree representation of a mathematical expression in MathML 2.0. An example of such a representation is illustrated in Appendix A.3.3 in the case of the formula of Appendix A.3.1. Each node corresponds to a MathML 2.0 tag. It should be noted that each node has a hierarchical level.

At operation 504, the mathematical expression compiler MathComp 220 calls a division function DivFct. The division function is capable of locating the "=" operator of the expression $Y=F(X)$ in the XML tree by searching for the expression mo ("="). Optionally, the division function DivFct verifies the presence of a single operator of this type in the XML tree. The division function DivFct splits the tree into an output part A and an input part B corresponding respectively to the parts of the MathML tree situated above and below the expression mo ("="), Appendices A.3.3.1, A.3.3.2 and A.3.3.3 illustrate this division. Appendix A.3.3.1 illustrates part A whilst Appendix A.3.3.3 illustrates part B. It should be noted that a mathematical formula could also be defined in the form $F(X)=Y$ without this fundamentally changing the functioning of the mathematical expression compiler MathComp 220.

The mathematical expression compiler MathComp 220 starts the processing by calling, for part A, an identification function IndFct at operation 506. The identification function IndFct the functioning of which will be described in further detail below is capable of identifying the variable symbol represented by part A.

The mathematical expression compiler MathComp 220 continues the processing of the tree by calling the identification function IndFct for part B at operation 508. The function IndFct is capable of identifying the variable symbols contained in part B as well as the function symbols and operators.

At operation 510, the mathematical expression compiler MathComp 220 generates the compilation tree from variable and function symbols and operators. Appendix A.3.4 shows the compilation tree corresponding to the formula of Appendix A.3.1.

Figure 6:
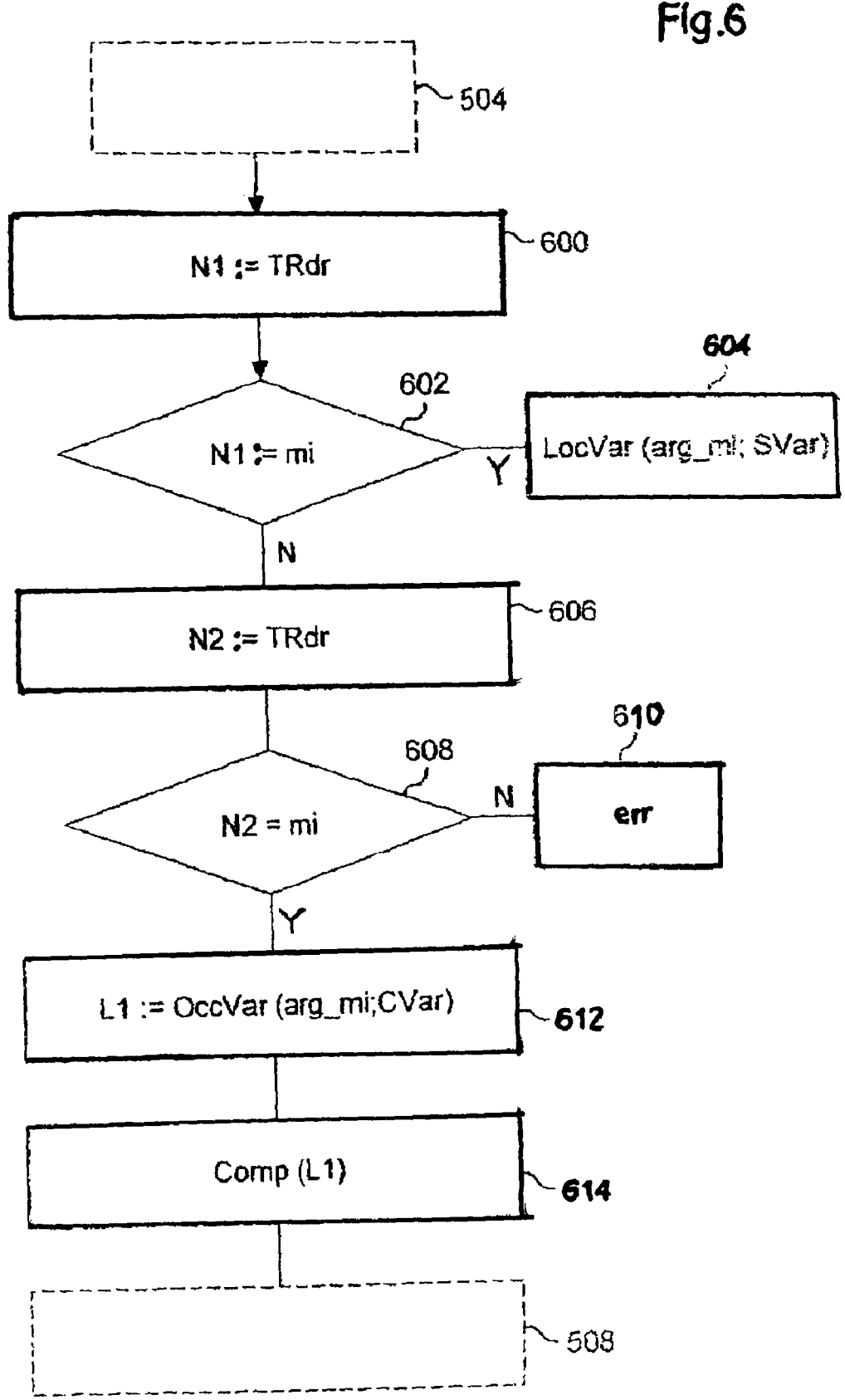

FIG. 6 illustrates in detail operation 506 of FIG. 5. At operation 600, the identification function IndFct calls a tree reading subfunction TRdr which returns the first N1 tag of level 1 in the tree. At operation 602, it is tested whether this first N1 tag is of mi type.

If so, then part A represents a simple symbol in the sense described above.

A location function LocFct is called with the following parameters:

The argument arg_mi of the mi tag, and

An identifier of the table in which to locate arg_mi, that is to say the simple symbol table SVar 132.

The location function LocFct returns the address in the data to be processed DAT 110 associated with the row containing arg_mi in nm (operation 604) and given by the variable dictionary VarDic 120.

If not, the first N1 tag found is of the msub, msup or msupsub type, that is to say part A represents a complex symbol. The reading function TRdr is then called to return the tag of lower hierarchical level N2 immediately following the node N1 (operation 606).

At operation 608, it is tested whether node N2 is of mi type. If not, there is an error (operation 610).

If so (operation 612), an occurrence search function OccVar is called with as parameters the argument arg_mi of the mi tag and an identifier of the table in which to locate arg_mi, that is to say the complex symbol table CVar 134. The occurrence search function OccVar returns a list L1 consisting of the part of the complex symbol table CVar 134 whereof the nm slot contains arg_mi.

At operation 614, a comparison function CompFct is called, which compares each element in the list L1 with the remainder of the tree in order to identify the designated variable.

Figure 7:
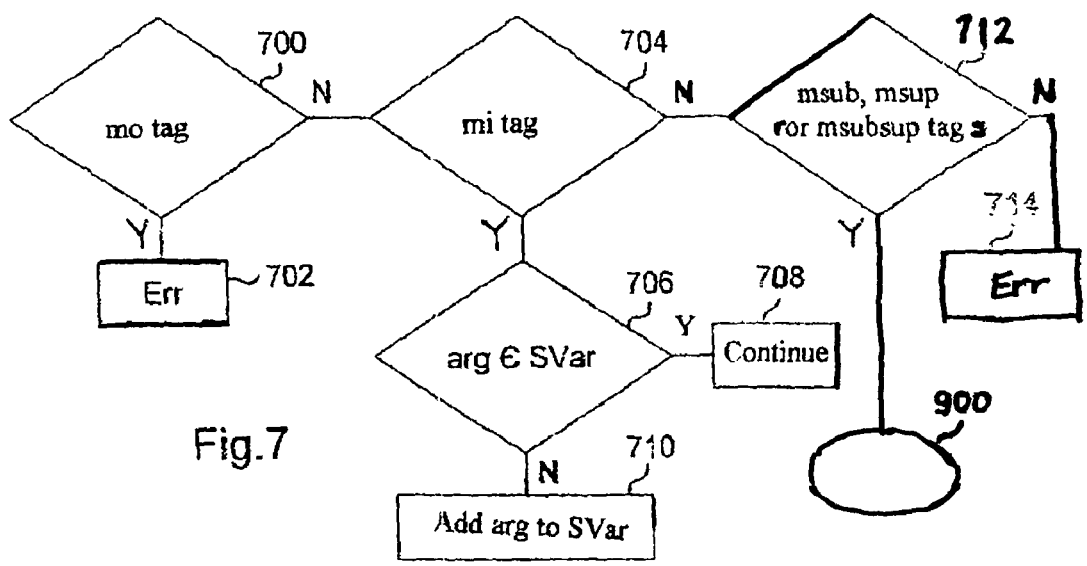
FIG. 7 is a flow diagram detailing operation 506 of FIG. 5.

FIG. 7 is a flow diagram that illustrates the processing by the mathematical expression compiler MathComp 220 of part A of an equation obtained at the output of the mathematical formula editor MathEdt 210 and after reading by the metalanguage reader XMLRdr. In other words, FIG. 7 details operation 506 of the flow diagram of FIG. 5.

The mathematical expression compilation program Mathcomp 220 comprises a list of so-called "boundary" tags that it is capable of reading recursively from the tree corresponding to part A. The list of boundary tags comprises, in particular, the following MathML 2.0 tags:

mrow;
mi;
mo;
mn;
msub, msup and msubsup.

Reading of the tree by the mathematical expression compiler MathComp 220 is done recursively by reading each of the nodes of the same hierarchical level from top to bottom of the tree and then starting again for the nodes of lower hierarchical level.

The mathematical expression compiler MathComp 220 reads the first boundary tag of the tree A. At operation 700, it is tested whether this first boundary tag read is an mo type tag. In MathML 2.0 language, an mo type tag defines a mathematical operator. If so, at operation 702, an error signal is issued, since part A corresponds to an output variable alone and therefore does not permit an operation symbol at this hierarchical level. If not, at operation 704, it is tested whether this first boundary tag is of mi type. An mi type tag in MathML 2.0 language defines an identifier, that is to say a character string with no particular mathematical meaning.

If so, it is checked that the argument of this mi tag belongs to the simple symbol dictionary SVar 132 at operation 706. More precisely, a search is made for this argument in the mm slots of the simple symbol dictionary SVar 132.

If so, the simple symbol identified by the mi tag is completely defined (i.e. a link exists between this simple symbol and the variable in the variable dictionary VarDic 130 to which it corresponds and therefore to the data of the corresponding data to be processed DAT 110). The processing then continues at 708. If not, the argument of this mi tag can be added to the simple symbol table SVar 132, at operation 710, and a corresponding variable created.

If, at operation 704, the first boundary tag read is not of mi type, then at operation 712 it is tested whether this tag is of msub, msup or msubsup type. In other words, it is tested whether the tag read defines a symbol with index alone, with exponent alone or with index and exponent, respectively. If not, an error is issued at operation 714 since none of the tags permitted at this place in the equation has been read. If an msub, msup or msubsup type tag was found at operation 712, then processing continues at operation 900 as will be described later. It then involves a complex symbol in the sense described above.

Figure 8:
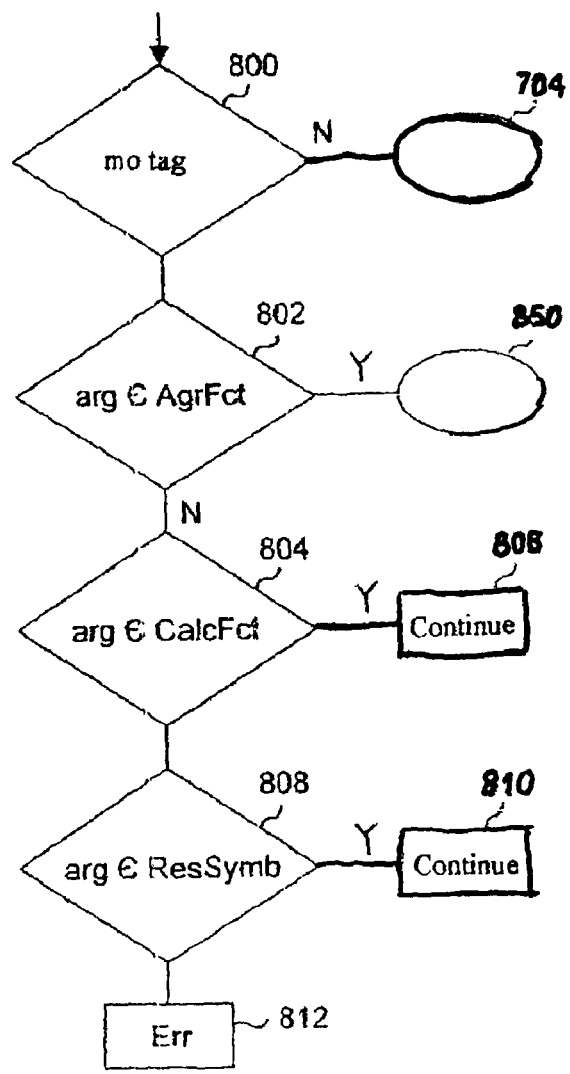
FIG. 8 is a flow diagram detailing operation 508 of FIG. 8.

FIG. 8 is a flow diagram illustrating the processing of part B of a mathematical equation obtained at the output of the mathematical formula editor MathEdt 210 by the mathematical expression compiler MathComp 220 and after reading by the metalanguage reader XMLRdr. In other words, FIG. 8 details operation 508 of the flow diagram of FIG. 5. The mathematical expression compiler MathComp 220 recursively reads each boundary tag first according to the hierarchical level, and then from top to bottom.

At operation 800, it is tested whether the first boundary tag read is of mo type. If so, this tag defines an operator symbol associated with a function that must be identified. If not, this tag is either an mi type tag, or an msub, msup or msubsup type tag. In both these cases, a return is made to the processing of msub, msup or msubsup type tags as described above and illustrated by FIG. 7 (operation 704 and those following).

Where the first boundary tag read is an mo type tag, at operation 802, it is checked whether the argument of this tag is contained in the aggregative function dictionary AgrFct 154.

Figure 8A:
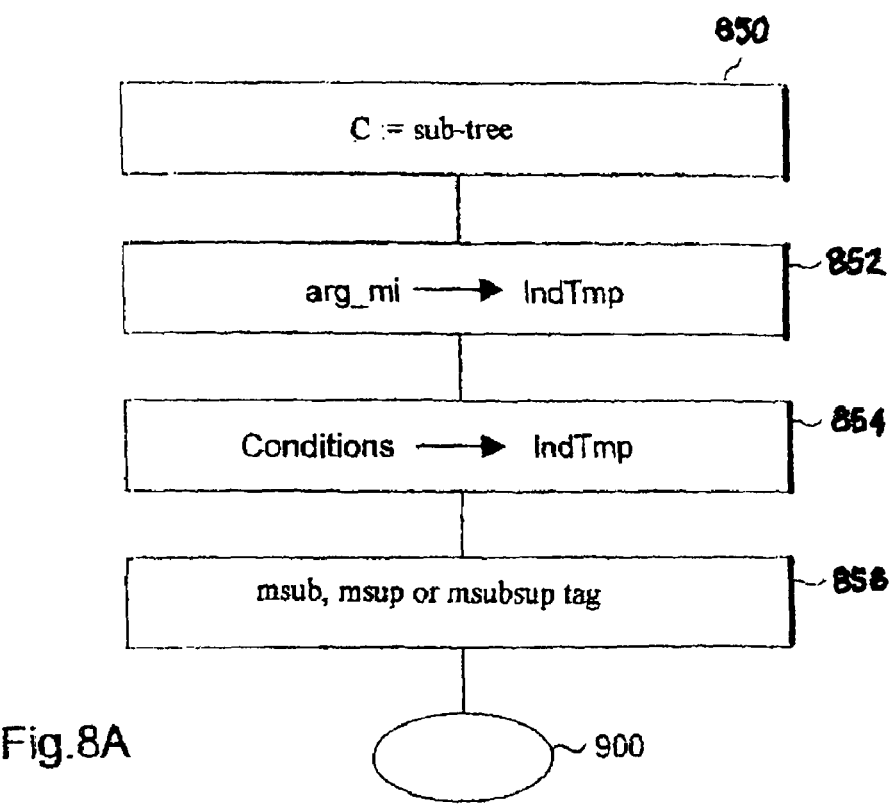
FIG. 8A is a flow diagram detailing operation 850 of FIG. 8.

If so, specific processing is carried out, which starts at operation 850 of the flow diagram of FIG. 8A. This processing will be described later.

If not, it is checked at operation 804 that the argument of the mo tag is contained in the calculation function dictionary CalcFct 152. If so, the function is identified and the processing continues at 806. If not, at operation 808, it is checked whether the argument of this tag is in the reserved symbol dictionary ResSymbDic 170. If so, the function is completely identified and the processing continues at 810. If not, an error message is issued at operation 812.

FIG. 8A is a flow diagram illustrating the specific processing implemented when an aggregative function symbol has been read at operation 802. The processing starts at operation 850 with the extraction of the sub-tree concerned by the aggregative function symbol. This sub-tree consists of all the tags situated below the mo type tag and of lower or equal hierarchical level. Such a sub-tree will be referred to subsequently as part C.

At operation 852, the first mi tag Immediately following the mo type tag considered at operation 802 is read (in the sense of reading from top to bottom with no distinction of hierarchical levels). The argument of this mi tag Introduces a character string forming the name of an aggregation index. The name of this aggregation index is stored in a temporary index table IndTmp in an nm slot.

At operation 854, the conditions on this index are extracted. The conditions on this index are introduced by mo type tags. The conditions are stored in the temporary index table IndTmp, not depicted, associated with the name of the ran index.

The msub, msup, or msubsup type tags immediately following the aggregation symbol revealed at operation 802 are read. These tags define complex variable symbols with which the aggregative function may be concerned. These tags are subjected to specific processing which will be described later. This processing starts with an operation 900 illustrated in FIG. 9. This processing is intended to identify the variables concerned.

Figure 9:
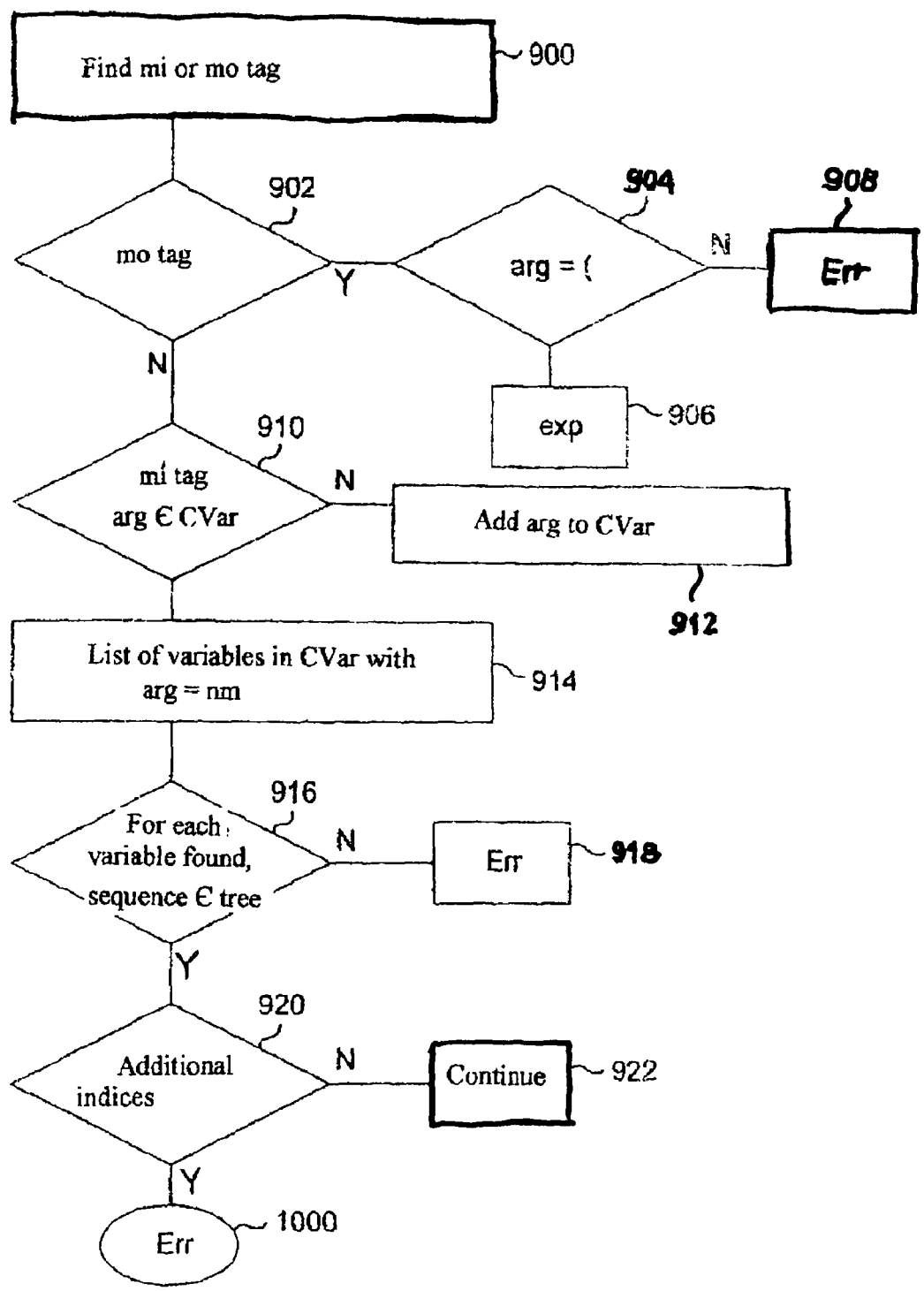
FIG. 9 is a flow diagram that details operation 900 of FIG. 7 and FIG. 8A.

FIG. 9 is a flow diagram illustrating the processing of complex variable symbols, that is to say those comprising indices and/or exponents. In other words, FIG. 9 describes the processing of msub, msup and msubsup type tags by the mathematical expression compiler MathComp 220.

Where such a tag is read, for example at operation 712 of the flow diagram of FIG. 7 or at operation 856, the processing implemented is as follows. At operation 900, the first mi type or mo type boundary is read. Reading is then done according to the sequence of the tags, independently of the hierarchical levels.

If the first tag read is of mo type (operation 902), then it is checked at operation 904 whether the argument of this tag is a left bracket "(". If so, it is not a variable that is concerned but the exponential function which is then identified (operation 906). If not, an error message is issued at operation 908.

If the first tag found is not of mo type (operation 902), then the first tag found is of mi type (operation 910). It is then checked that the argument of this tag is contained in the complex symbol dictionary CVar 134, still at operation 910. More precisely, the argument of this tag is searched for in the nm slots of the complex symbol dictionary CVar. If not, at operation 912, provision is made for the addition if necessary of this argument to the complex symbol table Cvar 134 in an nm slot and the creation of a new variable in the variable dictionary VarDic 120.

In the contrary case, at operation 914 there is issued a list of the variables contained in the complex symbol dictionary CVar 134 the name of which stored in the nm slot is equal to the argument of the mi tag. This issued list contains, for each variable symbol, all the character strings forming the exponent exp and/or the indices ind1, ind2, etc.

At operation 916, it is checked, for each variable issued, whether the sequence of MathML tags (identical types and arguments) of this variable matches the sequence of tags read in the portion of the tree in the process of being read.

If no issued variable is found in the tree read, then at operation 918 an error is issued. In other embodiments, provision can be made that, at operation 918, the mathematical expression compiler MathComp 220 stores the part of the formula not found in the complex symbol dictionary CVar in metalanguage. In this case, the error messages of operation 918 are not issued. This makes it possible to define later the variable corresponding to the symbol in question.

If the sequence of MathML tags for an issued variable has been found, then at operation 920 it is checked whether additional indices (that is to say indices not stored with the variable in the complex variable dictionary CVar 134) are defined in the tree. If so, particular processing is implemented, which starts with an operation 1000 and will be described later. If not, the variable is completely identified and the data of the associated data to be processed DAT 110 is located by means of the variable dictionary VarDic 130.

Figure 10A:
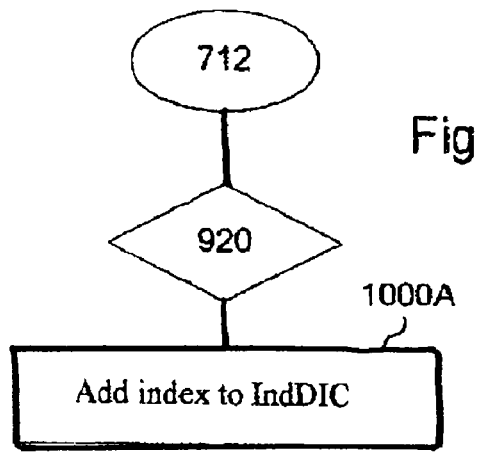
FIGS. 10A, 10B and 10C are flow diagrams that detail operation 1000 of FIG. 9 in different situations.

FIG. 10A specifies the processing carried out after operation 920 of FIG. 9 where a part A is processed. If part A is processed and indices are not present in the variable symbol dictionary VarSymbDic 130, then the program suggests to the user addition of the index to the index dictionary IndDic at operation 1000A.

Figure 10B:
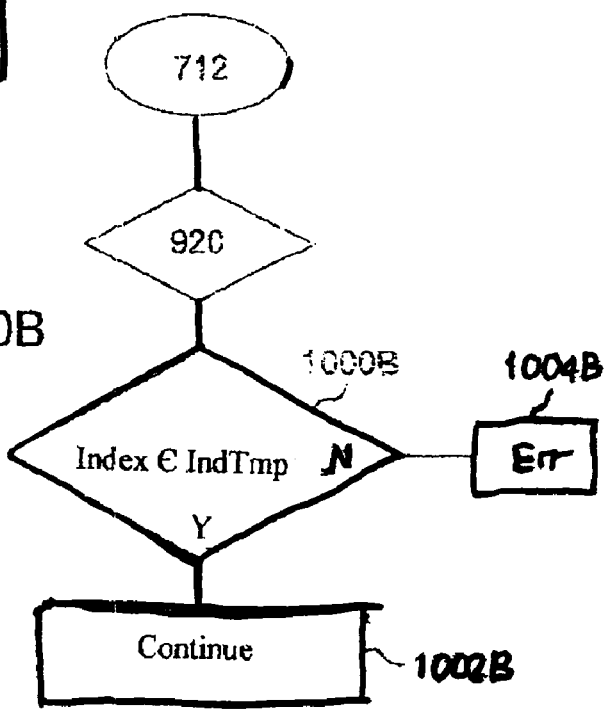

FIG. 10B specifies the processing carried out after operation 920 of FIG. 9 where a part B is processed. If part B is processed and indices are not present in the variable symbol dictionary VarSymbDic 130, then the program checks at operation 1000B whether the index is contained in the temporary index table IndTmp. If so, the index is present in the symbol of the input variable and therefore the index is identified (operation 1002B). If not, the program issues an error at operation 1004B.

Figure 10C:
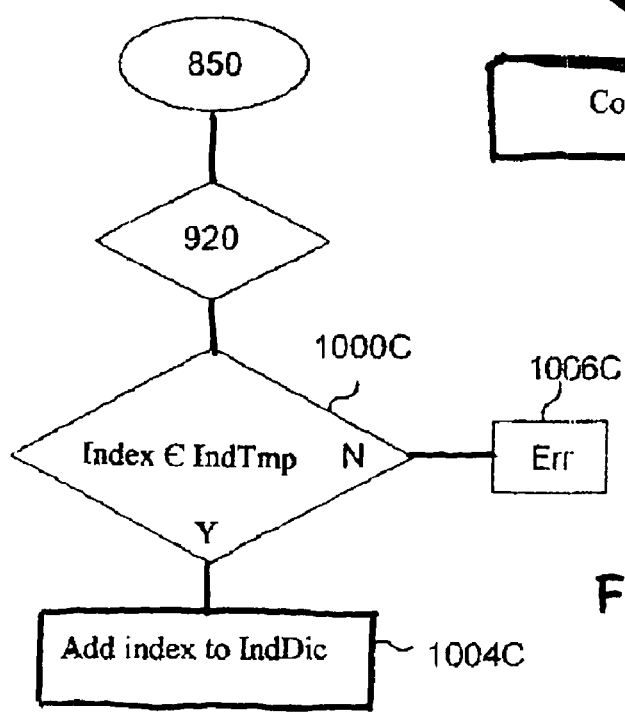

FIG. 10C specifies the processing carried out after operation 920 of FIG. 9 where a part C is processed. If part C is processed and indices are not present in the variable symbol dictionary VarSymbDic 130, then the program checks at operation 1000C whether the index is contained in the temporary index table IndTmp. If so, the index is either present in the symbol of the input variable or present in the aggregation operator. In both these cases, the index is identified and the index is added to the index dictionary IndDic 140 at operation 1002C. If not, the program issues an error at operation 1004C.

The tests of operations 1000B and 1000C and the error messages of operations 1004B and 1004C provide that, for example, a variable A defined as dependent on an index i is designated $A_i$. This could be generalised to variables with several indices and/or exponents. These operations guarantee amongst other things a clarity in the formal expression of a mathematical formula, in particular when it defines a variable.

In other embodiments, the notation A can be accepted for a variable dependent on i, i.e. the index i will be added to the index dictionary IndDic and the issuing of error messages of operations 1004B and 1004C can be omitted.

In yet other embodiments, the index i will not be added to the index dictionary IndDic but the issuing of error messages of operations 1004B and 1004C will be omitted. In these embodiments, the mathematical expression compiler MathComp 220 is arranged to keep an expression of the part of the formula concerned by the index i in metalanguage in tree form. When the mathematical expression compiler processes a more general formula including the preceding formula, it integrates the tree stored previously into the tree it is in the process of constructing.

It should be understood that the index dictionary IndDic does not have to keep an association between the index and numerical values of the database DB 100, at least at first. The index dictionary IndDic is then an open dictionary which to be added to later, for example when the mathematical expression compiler MathComp 220 acts on a formula specifying the numerical values of the index in question. The mathematical expression compiler MathComp 220 is capable of reacting to the absence of defined values of the index by storing the part of the formula concerned in metalanguage.

As an example of such embodiments, a variable $A_i$ defined as a function of an index i (for example $A_1=1+i$) is considered. The index i will be stored in the index dictionary IndDic and in the variable symbol dictionary VarSymbDic. However, the mathematical expression compiler MathComp 220 has finished the processing of the formula defining $A_i$, and there does not exist in the index dictionary IndDic any association between the index i and numerical values. It is now considered that the mathematical expression compiler MathComp 220 processes a formula including $A_i$ and specifying i (for example, $$B = \left(\sum_{i=1}^{i=10} Ai\right).$$

The mathematical expression compiler MathComp 220 completes the definition of i in the index dictionary IndDic by associating the index with the numerical values present in this formula.

Advantageously, the operations of inserting and searching in tables described above are implemented by the hashing method, which makes it possible to reduce the times for searching and inserting data in tables. The hashing method is known to persons skilled in the art and described briefly in Appendix 4. The variants of open addressing hashing and chaining hashing, described respectively in Appendices 4.3 and 4.4, can be used in the device according to the invention. Preferably, chaining hashing is put in place.

Figure 11:
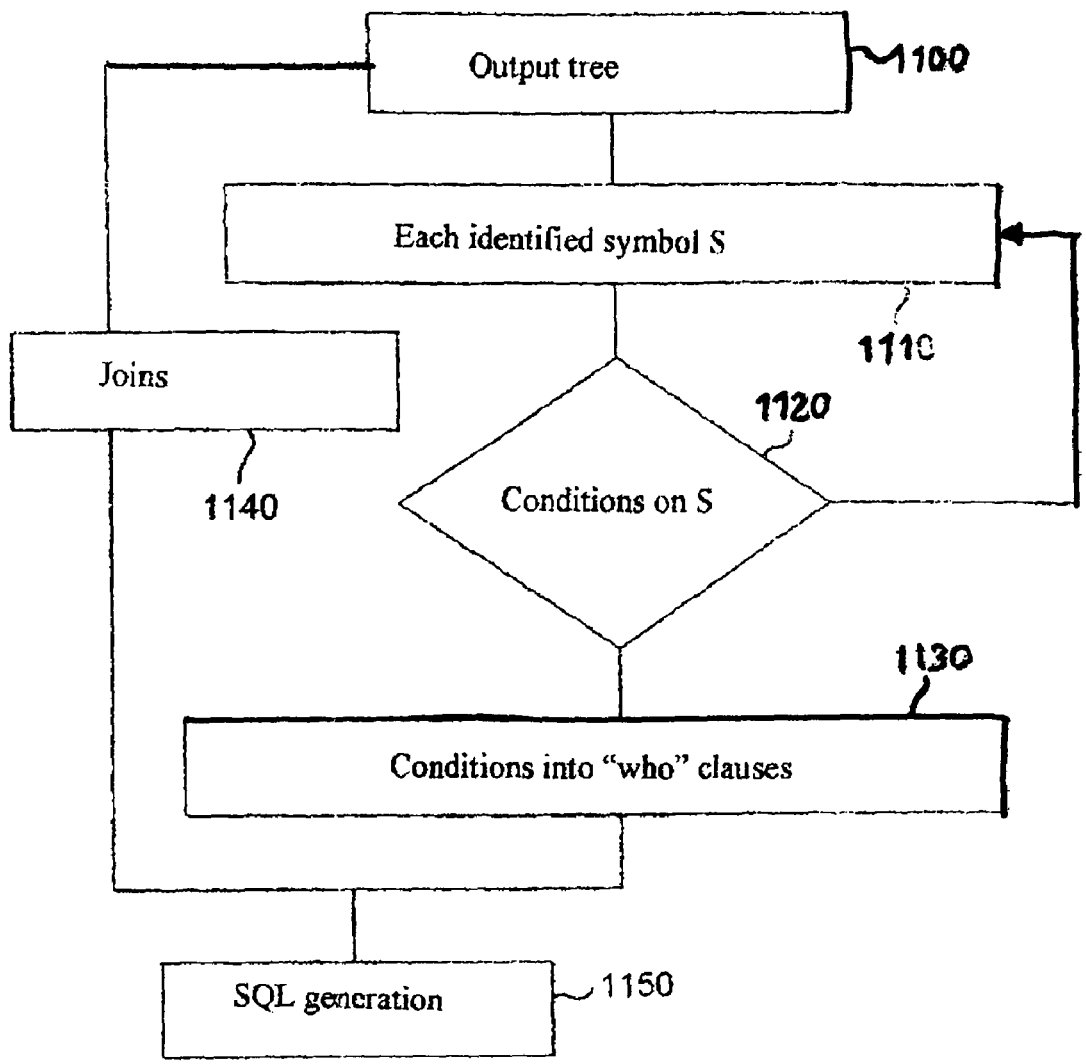
FIG. 11 is a flow diagram that illustrates the functioning of an element of the device of FIG. 1.

FIG. 11 illustrates in flow diagram form the functioning of the command generator ComGen 230. At operation 1100, the command generator ComGen 230 retrieves the compilation tree from the mathematical expression compiler MathComp 220. At operation 110, the command generator ComGen 230 starts particular processing which is carried out on each identified variable, referred to in general terms as S. The command generator ComGen 230 interacts with the condition editor CondEdt 240 in order to determine the conditions associated with the variable S, during operation 1120. If no condition is associated with the variable S, then the processing is carried out for the following variable. Otherwise, at operation 1130, the conditions are converted into "where" clauses.

In parallel, the command generator ComGen 230 carries out joins using structural constraints and logical constraints, resulting from the relationships between the tables, defined on the structure of the database, which are equivalent to implicit indices, and explicit indices, during operation 1140.

At operation 1150, the command generator produces a series of commands, or code, able to be interpreted by the engine of the database DB 100. Once the table variable pairs have been identified, the command generator ComGen 230 can if necessary create one or more temporary calculation tables CalcTmp 195. In particular, these temporary calculation tables CalcTmp 195 are created when the command generator ComGen 230 finds, in an expression (i.e. a set of nodes of the compilation tree of the same hierarchical level), an operation too complex to be able to be performed by means of a single query.

By way of example, in the particular case of a command expressed in SQL language, an expression of the type select "a+sum(b)", with for example a and b two columns and sum ( ) the function for adding rows of a column, cannot be used, since it combines elements of different set levels.

In particular, the presence in an expression of a call to a function that may contain queries, or an aggregative function, involves the use of a temporary table CalcTmp 195 in order to allow the breakdown of the expression into successive steps. In particular embodiments, the temporary tables CalcTmp 195 can be replaced by cursors.

Figure 12:
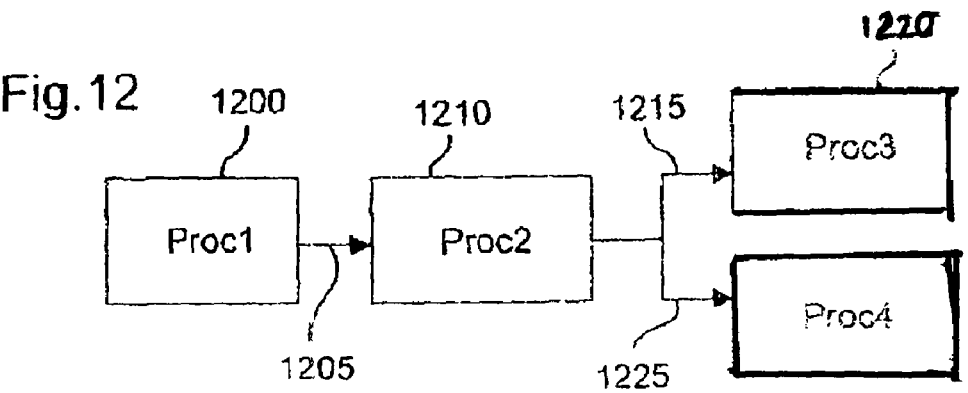
FIG. 12 is a diagram Illustrating a graphical user interface of another element of FIG. 1.

The data processing program DPP 200 furthermore comprises a processing editor ProEdt 250. The processing editor ProEdt 250 is a graphics editor allowing a user to define a structured sequence of processing operations to be applied to data of the data to be processed DAT 110. Each of the processing operations can be defined in the form of a mathematical formula entered by means of the mathematical formula editor MathEdt 210. As illustrated in FIG. 12, each processing operation Proc1, Proc2, etc. is represented by a processing box 1200, 1210, etc. respectively. The processing operations are interconnected by arrows, which define a sequence of the processing operations. By way of example, in FIG. 12, the arrow 1205 allows the user to define that processing operation Proc2 1210 must be carried out after processing operation Proc1 1200. The arrows 1215 and 1225 lay down that processing operations Proc3 and Proc4 respectively are to be carried out after processing operation Proc2. As the arrows 1215 and 1225 have the same origin, processing operations Proc3 and Proc4 are to be carried out in parallel.

The processing editor ProEdt 250 interacts with a processing dictionary ProcDic 190 of the database DB 100. The processing dictionary ProcDic 190 is capable of maintaining a link between a representation of a mathematical formula and a formula identifier, specific to each formula stored. Advantageously, the processing dictionary ProcDic 190 may also contain pre-produced formulae reusable by the user.

A mathematical formula can be stored in the processing dictionary ProcDic 190 in the form of a representation in metalanguage, for example MathML 2.0, coming for example from the mathematical expression editor MathEdt 210. Furthermore, a mathematical formula can be stored in interpreted tree form, for example by the expression compiler MathComp 230, in particular with the links between the variable symbols and the variables of the data to be processed DAT 110. Of course, the two representations can coexist in the processing dictionary ProcDic 190.

In the case of direct execution of the stored formula, the interpreted representation is preferred, whilst in the case of indirect execution (in parallel with another formula for example), the representation in metalanguage form is preferred.

The device according to the invention allows the definition and storage of a first formula of the form $Y=f(X)$, where $f$ represents any function, and a second formula of the form $Z=g(Y)$, where g also represents any function in metalanguage. During generation of the code intended to allow the calculation of Z, the command generator ComGen 230 reconstructs the formula into $Z=h(X)$ using a definition of Y by means of metadata. In other words, the variable Y does not need to be stored in numerical form in the database DB 100. The variable Y is instead stored in the form of a partially interpreted command tree, said command tree being inserted in the command tree resulting from the interpretation of Z in place of the variable Y.

The processing editor ProEdt 250 is capable of maintaining, for each box, a link between a particular box and a formula identifier in the processing dictionary ProcDic 190. Furthermore, the processing editor ProEdt 250 is capable of maintaining a list of arrows entered by the user, each being defined by a source formula identifier and a target formula identifier. A particular box is characterised as reference processing from which a representation of the sequence can be produced by means of all the arrows. A system of parent boxes that can be broken down into child boxes allows the user to simply produce complex sequences of expressions processed by the data processing program DDP 200.

Figure 13:
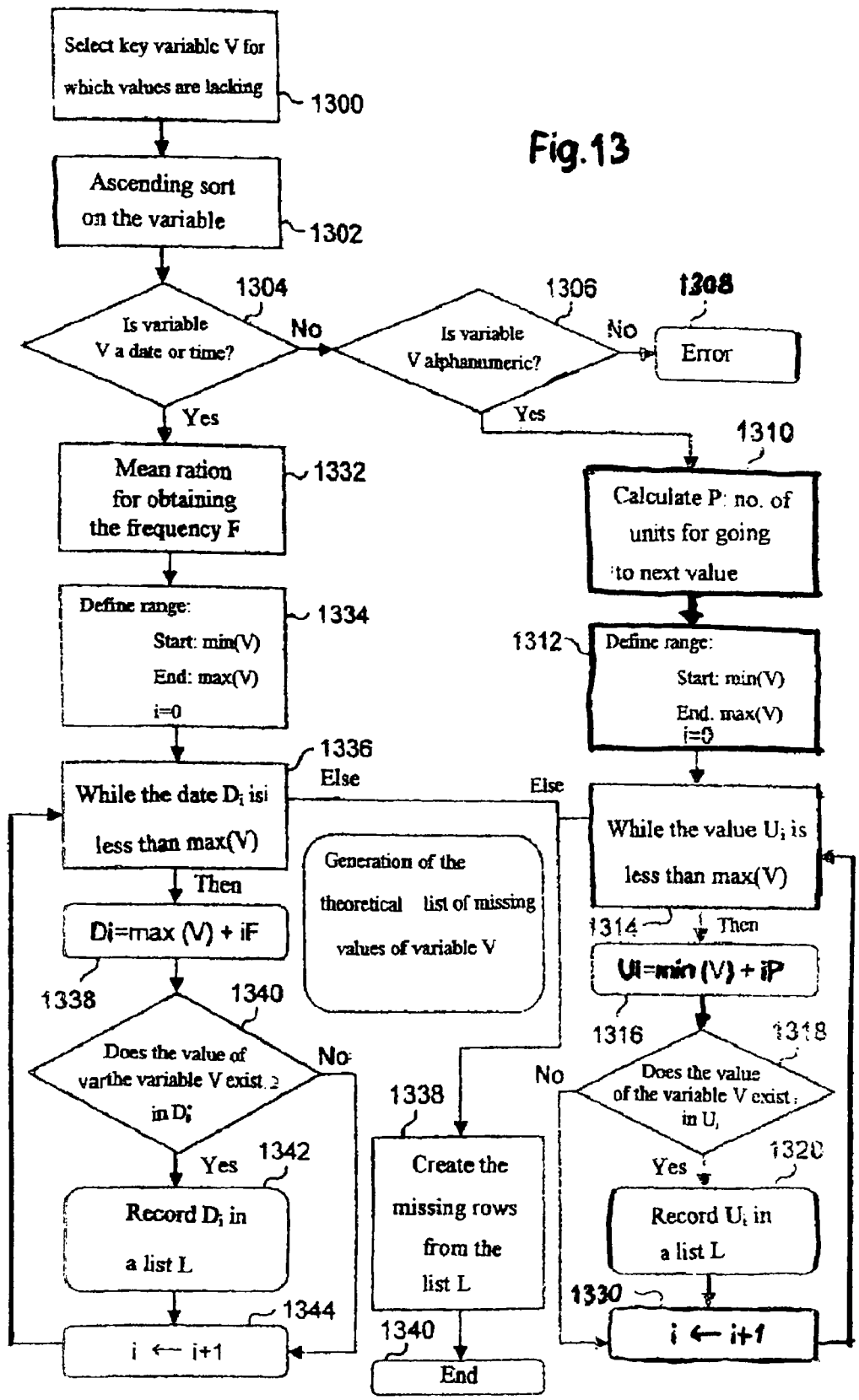
FIG. 13 is a flow diagram illustrating the functioning of vet another element of FIG. 1.

It should be noted here that other computing actions not defined by mathematical formulae can be implemented by the device according to the invention, including a particular processing operation for calculating missing data, which is illustrated in FIG. 13.

FIG. 13 is a flow diagram illustrating the functioning of a missing data calculator MDATCalc 260 integrated in the data processing program DDP 200. The missing data calculator MDATCalc 260 is capable of interacting with the variable dictionary VarDic 120 in order to select a key variable, here designated V, for which it lacks values (operation 1300). At operation 1302, the calculator passes a command, for example an SQL command, to the engine of the database DB 100 for carrying out an ascending sort on the variable. At operation 1304, it is tested whether V is of date or time type.
  If not, at operation 1306, it is tested whether V is of alphanumeric type.
  If not, an error is issued, since the missing data calculator cannot perform the processing (operation 1308).
  If so, at operation 1310, the calculator sets up a step P, which separates the data items of the variable V.

At operation 1312, the range of the variable is defined by setting up a start value as the smallest value of the variable V and an end value as the largest value of the variable V. An increment variable i is defined and set to the value 0.

At operation 1314, a loop is initiated whereof the stop condition is that the value Ui to be calculated is greater than the end value.

At operation 1316, the value of Ui is calculated as being equal to the smallest value of the variable V to which there is added i times the step P calculated at operation 1310.

At operation 1318, it is tested whether the value of the variable V exists in Ui:

If so, Ui is recorded in a list L at operation 1320, at 1330 i is incremented and the loop starts again at 1314;

If not, i is incremented by the value 1 at 1330, and then, the loop starts again at 1314.

If, at operation 1304, it is determined that the variable V is a date or a time, then at the step 1332 a mean ratio is calculated so as to determine a frequency F. At operation 1334, the range of the variable V is determined in a manner analogous to operation 1314.

At step 1336, a loop, analogous to the loop initiated at 1314, is initiated the output condition of which is that the calculated date Di is greater than the maximum value of the variable V, max(V), determined at 1334. As long as the calculated date Di is less than max(V), Di is calculated as being equal to the smallest value of the variable V determined at 1334 to which there is added i times the frequency F calculated at 1332.

Then the steps 1340, 1342 and 1334 are carried out, which are analogous to the steps 1318, 1320 and 1330 respectively.

In both cases described above, the output of the loops initiated at 1314 and 1336 continues at 1338 by creating the missing rows using the list L produced in the successive steps 1320, or 1342. The program ends at 1340.

Figure 14:
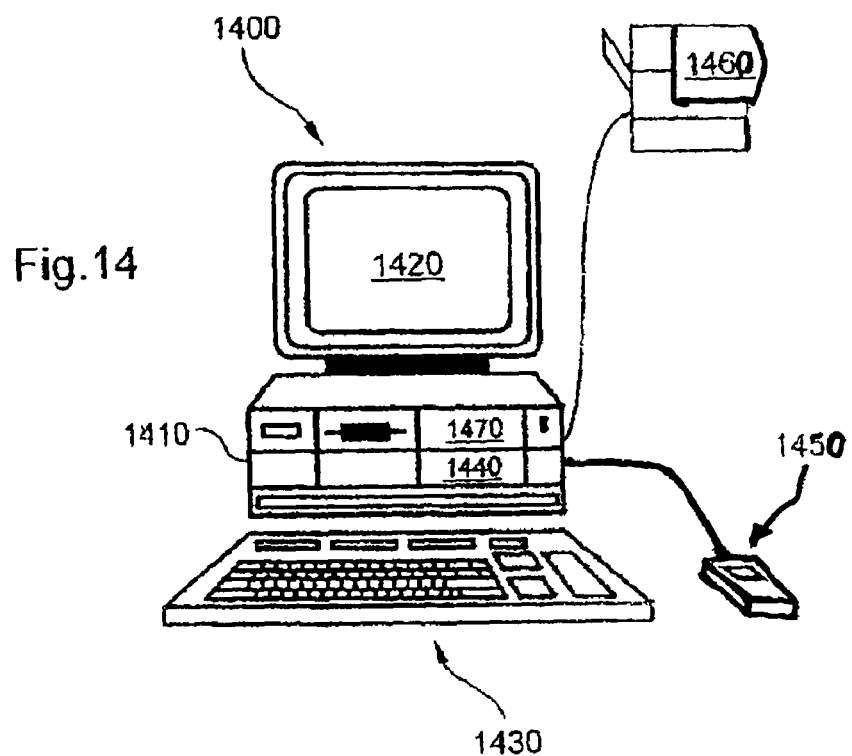
FIG. 14 is a diagram illustrating an embodiment of the data processing device according to the invention.

FIG. 14 illustrates an embodiment of the data processing device according to the invention. The computer 1400 comprises a central unit 1410 incorporating in particular a processing unit or CPU and random access memory, a screen 1420, a keyboard 1430, mass memory 1440 for example of hard disk type, a pointing device 1450 for example of mouse type, an optional printer 1460 and a network access peripheral 1470, also optional.

The mass memory 1440, or any other memory, of the computer 1400 houses an operating system with a graphical user interface. The operating system is launched, in a known manner, generally when the computer is started up.

Furthermore the mass memory 1440 houses the data processing program DPP 200 and the database DB 100. The data processing program DPP 200 can be executed by means of the processing unit or CPU.

The data processing device according to the invention can comprise software intended to be executed in the memory of a central unit, for example the mass memory 1440 of the computer 1400 of FIG. 14. In particular, the data processing program DPP 200 and the database DAB 100 may constitute software programs that are distinct but capable of cooperating.

The functioning of the device according to the invention, as described previously, can also be expressed in the form of a process.

There has been described above the case of definition of a variable whereof the index is not fully determined at the time of this definition. It was explained that, in this case, the index was totally defined (i.e. pointing directly or indirectly to numerical values) in a more general mathematical expression using said variable. It should be understood that a replacement of the variable by its interpreted tree is carried out by the command generator ComGen 230 when the latter processes the general formula. This can be generalised to cases of formulae defined incompletely (i.e. the compilation tree is not completely interpreted) but reused in expressions completing their definition, or else when a formula element is a priori absent from the database but defined subsequently.

Other embodiments can be provided for from the above description.

The data to be processed DAT 110 can be contained in a database distinct from the database DB 100 and linked to the data processing program DPP 200 and to the rest of the database DB 100.

The data processing program DPP 200 can be housed in the memory of different computers of the type illustrated by FIG. 14 connected by means of their network access peripheral 1410 to a server type computer the mass memory of which houses the database DB 100.

The data processing program DPP 200 can be housed in the memory of a server type computer and controlled from an interface program executed in a remote computer. For example, the data processing program DPP 200 can be provided with means allowing it to be operated from an Internet browser executed in a remote computer.

The database DB 100 and/or the data processing program DPP 200 can be provided with means making it possible to supply the database DB 100 with data to be processed DAT 100, for example by extraction of data from remote databases.

The invention also covers the software described, made available on any computer-readable medium. The expression "computer-readable medium" comprises magnetic, optical and/or electronic data storage media, as well as a transmission medium or vehicle, such as an analog or digital signal.

The invention is not limited to the embodiments described above, solely by way of example, but it includes all variants that can be envisaged by persons skilled in the art.

APPENDIX 1

Glossary

A.1.1—Database

Any set of structured files, capable of being interconnected by links between these files.

A.1.2—Table

The basic elements of a database are the "tables". Each table is a set of rows; each row is organised as one or more columns; and each column corresponds to a data type. Each row comprises one and only one value (the "data") for each column in the table. Physically, the storage of the data may correspond to this tabular structure, or be different.

A.1.3—Mathematical Natural Language

Description of a mathematical formula or mathematical conditions using conventional mathematical symbols such as, for example:

$\Sigma, +, \Pi, \sqrt{}, f(x), x^n$

The mathematical convention used may be that of the French scientific educational system, for example.

A.1.4—Variable

A.1.4.1—In the mathematical sense, a quantity capable of changing value.

A.1.4.2—In the database sense, an identified link to stored data, i.e. to part of one or more files.

A.1.5—Operator

Symbol representing an operation or series of operations to be performed on any concepts, for example logical, mathematical or physical ones.

A.1.6—Variable Symbol

Series of characters associated with one and only one variable in order to represent this variable in mathematical natural language.

By convention, a symbol is made up of a variable name in the form of a first series of characters, an exponent in the form of a second series of characters, and indices in the form of a third series of characters and the comma "," character as a particular index. The exponent and indices are optional.

The first series can consist of upper case or lower case alphabetic characters. Operators are prohibited.

The second series and third series can consist of all characters with no restriction. The second and third series are optional.

Indices are separated by the comma ",".character. The third series of characters can thus be broken down into several series of characters each associated with an index.

A.1.7—Function Symbol

Symbol associated with a mathematical function in mathematical natural language. For example the symbol of the square root function is $\sqrt{\phantom{x}}$.

A.1.8—MathML 2.0 language

Specialisation for mathematics of the standard formatting language for XML structured data. The MathML language consists, like the XML language, of "opening tags" and "closing tags" which make it possible to identify the elements making up a mathematical expression. Different variants of this metalanguage exist, such as presentation" and "semantic". The "presentation" variant is used here.

A.1.9—Compilation Tree

A.1.9.1—N-ary tree containing the operations to be performed in a hierarchical manner corresponding to mathematical priority rules. Let $f$ be a function, then the node f of the tree contains the parameters of the function $f$, that is to say the parameters of the function $f$ are sub-nodes of the node A.1.9.2—Tree-structure representation of a mathematical formula consisting of simple or complex functions, but structured for transcription into any computing language.

A.1.9.3—Structured and hierarchical organisation of compilation steps. The compilation tree corresponds to the pre-compilation phase interpreting the sequencing of a mathematical expression expressed in metalanguage.

A.1.10—Key or Key Column

Column of a database capable of uniquely defining, alone or in combination with other key columns, one row in a database file.

A.1.11—Calculation Function

Function for which the dimension of the symbol associated with the output variable is less than or equal to the dimension of the variables to which said function is applied. For example the Neper logarithm function ln is a calculation function.

A.1.12—Aggregative Function

Function for which the dimension of the symbol associated with the output variable is strictly less than the dimension of the variables to which said function is applied. For example the product function on the index i, Π and the sum function on the index i, $$\sum_i$$

are aggregative functions.

A.1.13—Dimension of a Variable

Number of independent variables the value of which must be known in order to know the value of said variable, A.1.14—Dimension of a variable symbol Number of indices associated with a variable symbol. The dimension of a variable symbol corresponds to the dimension of the variable with which it is associated. Each index corresponds to an independent variable.

A.1.15—Condition Operators

The operators If, Then, Else, While; <, >, =, ≠, Or, AND and Not are condition operators.

APPENDIX 2

A.2.1—Formula expressed in mathematical natural language $$x = \frac{-b \pm \sqrt{b^2 - 4ac}}{2a}$$

A.2.2—Formula of Appendix A.2.1 expressed in MathML 2.0 language

```
<mrow>
    <mi>x</mi>
    <mo>=</mo>
    <mfrac>
        <mrow>
            <mrow>
                <mo>-</mo>
                <mi>b</mi>
            </mrow>
            <mo>±</mo>
            <msqrt>
                <mrow>
                    <msup>
                        <mi>b</mi>
                        <mn>2</mn>
                    </msup>
                    <mo>-</mo>
                    <mrow>
                        <mn>4</mn>
                        <mo>⁢</mo>
                        <mi>a</mi>
                        <mo>⁢</mo>
                        <mi>c</mi>
                    </mrow>
                </mrow>
            </msqrt>
        </mrow>
        <mrow>
            <mn>2</mn>
            <mo>⁢</mo>
            <mi>a</mi>
        </mrow>
    </mfrac>
</mrow>
```

A.2.3—Example of a variable symbol $\text{Dcut}_{ind,j,j}^{31/12/n-1}$

A.2.4—Variable symbol A.2.3 in MathML 2.0 language

```
                <math>
                    <mrow>
A.2.4.1             <msubsup>
A.2.4.2                 <mrow>
                            <mi>Dcut</mi>
                        </mrow>
A.2.4.3                 <mrow>
                            <mi>ind</mi>
                            <mo>,</mo>
                            <mi>j</mi>
                            <mo>,</mo>
                            <msub>
                                <mrow>
                                    <mi>m</mi>
                                </mrow>
```

```
                        <mrow>
                            <mi>k</mi>
                        </mrow>
                    </msub>
                </mrow>
A.2.4.4             <mrow>
                        <mi>31/12/n−1</mi>
                    </mrow>
A 2.4.5.        </msubsup>
            </mrow>
        </math>
```

APPENDIX

A.3.1—Formula in mathematical natural language $$a_i = b_i + \sum_j c_{i,j}$$

A.3.2—Formula A.3.1 in MathML 2.0

```
<m:math mxlns:m='http://www.w3.org/1998/Math/MathML'>
    <m:mrow>
        <m:msub>
            <m:mi>a</m:mi>
            <m:mi>i</m:mi>
        </m:msub>
        <m:mo>=</m:mo>
        <m:mrow>
            <m:msub>
                <m:mi>b<m:mi>
                <m:mi>i<m:mi>
            </m:msub>
            <m:mo>+</m:mo>
            <m:mrow>
                <m:munder>
                    <m:mo>∑</m:mo>
                    <m:mrow>
                        <m:mi>j</m:mi>
                    </m:mrow>
                </m:munder>
                <m:msub>
                    <m:mi>c</m:mi>
                    <m:mrow>
                        <m:mi>i</m:mi>
                        <m:mo>,</m:mo>
                        <m:mi>j</m:mi>
                    </m:mrow>
                </m:msub>
            </m:mrow>
        </m:mrow>
    </m:mrow>
</m:math>
```

A.3.3—Formula A.3.1 as an XML tree

```
A.3.3.1         mrow
                    msub
                        mi ("a")
                        mi ("i")
A.3.3.2             mo ("=")
A.3.3.3             mrow
                        msub
                            mi ("b")
                            mi ("i")
                        mo ("+")
                        mrow
                            munder
                                mo ("∑")
                                mrow
                                    mi ("j")
                        msub
                            mi ("c")
                            mrow
                                mi ("i")
                                mo (",")
                                mi ("j")
```

A.3.4—Formula A.3.1 in compilation tree form

| "Left" tree | = | "Right" tree | + | HiddenFct |
|---|---|---|---|---|
| a (i) | | b (i) | | |
| | | "HiddenFct" tree | | |
| | | Sigma | | |
| | | Condition on "j" | | c (i, j) |

APPENDIX 4

A.4.1 Hashing

Hashing makes it possible to catty out search and insertion operations in a table in a constant time. Associative memories have this property: the position occupied by an object is determined solely by this object. It is sufficient to calculate the position in memory of this object, i.e. to have a function $f$ which associates with an object x a position h(x). The time for calculating the position h(x) must be independent of x and as small as possible.

The organisation of hash tables contrasts radically with that of ordered tables: in an ordered table, the position of an object depends on the number of smaller objects that have already been inserted in the table.

To insert into a table the elements of a set [0, N−1], a trivial solution consists of using an array t of size N and of storing each object i in t[i] with h(i)=i.

To process any set E of N integers, it is necessary to effectively construct an injective function h of the set E in the set of indices of the array [0, N−1], To insert, into a table, objects of a cardinal set E larger, perhaps even much larger, than N, it is necessary to construct a function which, although non-injective, has good dispersion properties.

A.4.2 Hash function

The function h defined by the following formula is a simple example of a hash function on strings of length l with values in the interval [0, N−1].

$$h(x) = \sum_{i=0}^{l-1} x[i] B^{l-1-i} \bmod N$$

where—B is a power of 2 to facilitate the calculation, for example B is equal to 256; and —N is a prime number to avoid arithmetic collisions, h(x) is referred to as the hash value associated with the key x. As the hash function h is not injective, it is necessary to deal with collisions. There is a collision when two different keys x and y, (x≠y), have the same hash value, ((h(x)=h(y). Appendices A.4.3 and A.4.4 describe two resolution techniques, chosen according to whether the available memory space is unlimited or not.

A.4.3 Open Addressing Hashing

The hash table is implemented as an array t the slots of which will contain the objects. Initially, the table is empty: each slot contains a special object empty, for example, an object for which the key is the empty string " ".

Insertion operations are carried out as follows:

If an object with key x has to be inserted and t[h(x)] is empty, then the insertion is cried out at this place.

If t[h(x)] is already occupied and the content has a key different from x, then auxiliary hash values $h_1(x)$, $h_2(x)$, etc. are calculated until an empty $t[h_i(x)]$ or one containing an object with key x is found.

To generate these auxiliary hash values, a simple method is to choose $h_i(x)$ as indicated by the following formula:

$$h_i(i) = (h(x)+i) \bmod N$$

This method, referred to as linear hashing, consists of trying the slots following t[(h(x)]. Other methods exist, such as quadratic hashing, double hashing or random hashing, which have better dispersion capabilities.

To search for an object with key x, the objects at t[(h(x)], and if necessary at $t[h_1(x)]$, $t[h_2(x)]$, etc., are tested until the key of the object that is situated there is equal to x, or else the object is empty.

When the table also allows deletions, it is necessary to replace a deleted object with a special object deleted, distinct from the empty object. During insertion, the first empty or deleted slot is used, whereas the search procedure stops only at the first empty slot.

At most, N operations are necessary, N being the size of the table. The load factor α of a hash table of size N containing n objects is defined as follows:

$$\alpha = \frac{n}{N}$$

α is always between 0 and 1. To give an asymptotic estimate of the complexity of the operations, n and N are made to tend to infinity, α remaining constant. It can be shown that, assuming uniformity, the mean number of accesses necessary for a negative search is at most:

$$\frac{1}{1-\alpha},$$

and for a positive search:

$$\frac{1}{\alpha}\log\frac{1}{1-\alpha} + \frac{1}{\alpha}$$

For example, for a half-full table, it must be expected to make 2 accesses for the search for an object not situated in the table, and 3.387 accesses if it is situated therein. It is clearly an algorithm in Θ(1).

A.4.4 Chaining Hashing

The method of open addressing hashing with linear resolution has the drawback of performing comparisons with several successive slots of the table which nevertheless do not have the same hash value as the string being sought. In order to avoid these unnecessary comparisons, chains linking the objects having the same hash value are made.

The hash table is implemented by an array of pointers and not as an array of records. Searching for a record is done simply by running through the list of records having the same hash value, using the function for searching on chained lists.

Insertion of a record d in a table t is performed as follows.

A search is made for the key x in t[h(x)].

In the event of failure, there is dynamic allocation of a new cell the two fields of which are filled and which is placed at the head of the chained list.

In the event of success, the old field is replaced by the new one.

Deletion of a record from a table is more difficult, since it is necessary to determine the cell preceding the cell c containing the record to be deleted. The slot of the head cell, which has no predecessor, must be dealt with separately. In all cases, the deleted cell must be de-allocated by an erase function.

The load factor α is the mean length of the chained lists. Assuming uniformity of the hash function, it can be shown that the mean number of accesses necessary for a search, either negative or positive, is at most 1+α.

The invention claimed is:

1. A data processing device comprising:
a processing unit configured to cooperate with a database, the database including data tables; and
a graphical user interface configured to allow a user to input a mathematical expression, wherein
the processing unit includes,
a mathematical expression editor configured to establish a current software representation of the mathematical expression in interaction with the graphical user interface, the mathematical expression being in natural mathematical language and including at least one multi-valued mathematical variable symbol having an index and/or an exponent, and a mathematical aggregative symbol for operation with the at least one multi-valued mathematical variable symbol,
a symbol dictionary configured to store first metadata related to the at least one multi-valued mathematical variable symbol, and comprising information as to a structure of tables in the database,
a condition editor configured to produce a condition expression, associated to the at least one multi-valued mathematical variable symbol, the condition expression being operable in conjunction with the first metadata for selecting a subset of data in the database, and
a request generator configured to process the current software representation to produce a code sequence executing the mathematical expression according to rules of the natural mathematical language and, upon recognition of the mathematical aggregative symbol and the at least one multi-valued variable symbol with which it operates,
to use the condition editor to produce a current condition expression,
to use the first metadata to produce code capable of using the current condition expression to fill a working data array with said subset of data, and
to combine an operator corresponding to the mathematical aggregative symbol with the working data array.

2. A data processing device according to claim 1, wherein the request generator includes a mechanism configured to selectively carry out different processing operations depending upon a comparison of a string with three sets of different possibilities, representing respectively the mathematical aggregative symbol, a simple mathematical symbol and a reserved mathematical symbol, the mechanism being configured to be activated on a test relating to a mathematical operator identifier.

3. A data processing device according to claim 2, wherein the request generator includes a mechanism configured to selectively carry out different processing operations based on a test relating to a mathematical variable identifier.

4. A data processing device according to claim 2, wherein the at least one multi-valued mathematical variable symbol is associated with at least one column of at least one table in the symbol dictionary, and current condition expression restricts the set of values contained in this column.

5. A data processing device according to claim 1, further comprising a processing editor, wherein the graphical user interface is configured to allow the user to input a sequence of mathematical expressions, and the mathematical expression editor is configured to produce a current software representation of the sequence of mathematical expressions in interaction with the graphical user interface.

6. A data processing device according to claim 1, further comprising a supplementary request generator configured to produce, for a particular multi-valued variable symbol, a mathematical progression interlinking data stored in correspondence with the particular multi-valued variable symbol.

7. A data processing device according to claim 6, wherein the supplementary request generator is configured to generate code executing progression to complete a set of stored data associated with the particular multi-valued variable.

8. A data processing device according to claim 1, wherein the mathematical aggregative symbol includes a sum operator symbol or a product operator symbol.

9. A data processing device according to claim 1, wherein the graphical user interface is configured to allow a user to input a number of mathematical expressions, the mathematical expression editor is configured to establish a current software representation of each of the number of mathematical expressions in interaction with the graphical user interface, each of the number of mathematical expressions being in the natural mathematical language, some of the number of mathematical expressions including at least one multi-valued mathematical variable symbol, having an index and/or an exponent, and at least one of the number of mathematical expressions having a mathematical aggregative symbol for operation with the at least one multi-valued mathematical variable symbol, the request generator is configured to process the current software representations of each of the number of mathematical expressions iteratively and, upon recognition of the at least one mathematical aggregative symbol and/or the multi-valued variable symbol with which it operates to use the first metadata and the code already produced to produce a code sequence executing the number of mathematical expressions according to rules of the natural mathematical language.

10. A data processing device according to claim 1, wherein the condition editor is configured to be activated in interaction with the graphical user interface to produce the current condition expression associated with the multi-valued mathematical variable symbol.

11. A data processing device according to claim 1, wherein the request generator is configured to process the current software representation using the first metadata without immediate correspondence with the data stored in the database.

12. A data processing device according to claim 1, wherein the working array is an open array, configured to be filled later by the request generator for processing of successive mathematical expressions.

13. A program product stored in a non-transitory computer readable medium and capable of cooperating with a computer to constitute the data processing device according to claim 1.

* * * * *